INVENTOR
ROBERT W. HUGHES
BY Alfred C. Hill
AGENT

Nov. 10, 1959 R. W. HUGHES 2,912,507

PULSE COMMUNICATION SYSTEM

Filed July 8, 1955 2 Sheets-Sheet 2

INVENTOR
ROBERT W. HUGHES
BY Alfred C. Hill
AGENT

United States Patent Office 2,912,507
Patented Nov. 10, 1959

2,912,507

PULSE COMMUNICATION SYSTEM

Robert W. Hughes, Mountain Lakes, N.J., assignor to International Telephone and Telegraph Corporation, Nutley, N.J., a corporation of Maryland Application July 8, 1955, Serial No. 520,895
2 Claims. (Cl. 179—15)

This invention relates to pulse communication systems and more particularly to an improved timing signal source for time division multiplex pulse communication systems.

The achievement of time divisions in a time division multiplex system has been accomplished in the past by employing a timing signal source having an independent oscillator to develop a signal of fixed repetition frequency and a timing signal distribution device energized by the output of the oscillator to distribute a plurality of signals to a like plurality of channel modulators, each of the plurality of signals having different timing. The device usually employed to develop and distribute the timing signals, and thus establish the time divisions of the multiplex signal, is a delay line having a plurality of equally spaced taps therealong to provide a time interval between adjacent channels which should be as equal as possible to prevent channel cross-talk. In timing signal sources of this type, it is necessary to employ a precision oscillator since, once the initial timing accuracy is obtained by circuit adjustments a change in the oscillator frequency will adversely affect the timing and spacing of the last time interval. Likewise, any changes in components of the delay line will affect the electrical length of the delay line and thus, the time spacing of adjacent delay line taps. In the worst condition this effect would be lumped in one channel spacing causing appreciable cross-talk.

Therefore, it is an object of this invention to provide a timing signal source for time division multiplex systems that will substantially eliminate non-proportional timing errors due to changes in component values of said timing signal source.

Another object of this invention is to provide a timing signal source for time division multiplex systems that will substantially eliminate the need for factory or field adjustment of the oscillator frequency.

A feature of this invention is the provision of a timing signal source comprising an amplifier and a delay line, timing signal distribution, at least a portion of said delay line being connected with said amplifier and constituting the frequency determining element of a phase shift oscillator which produces the repetition frequency for the multiplex system. Said delay line further includes a plurality of equal delay sections having output taps connected thereto such that the outputs of the taps comprise the desired plurality of equally spaced timing signals for channel signal generation.

Figure 1:
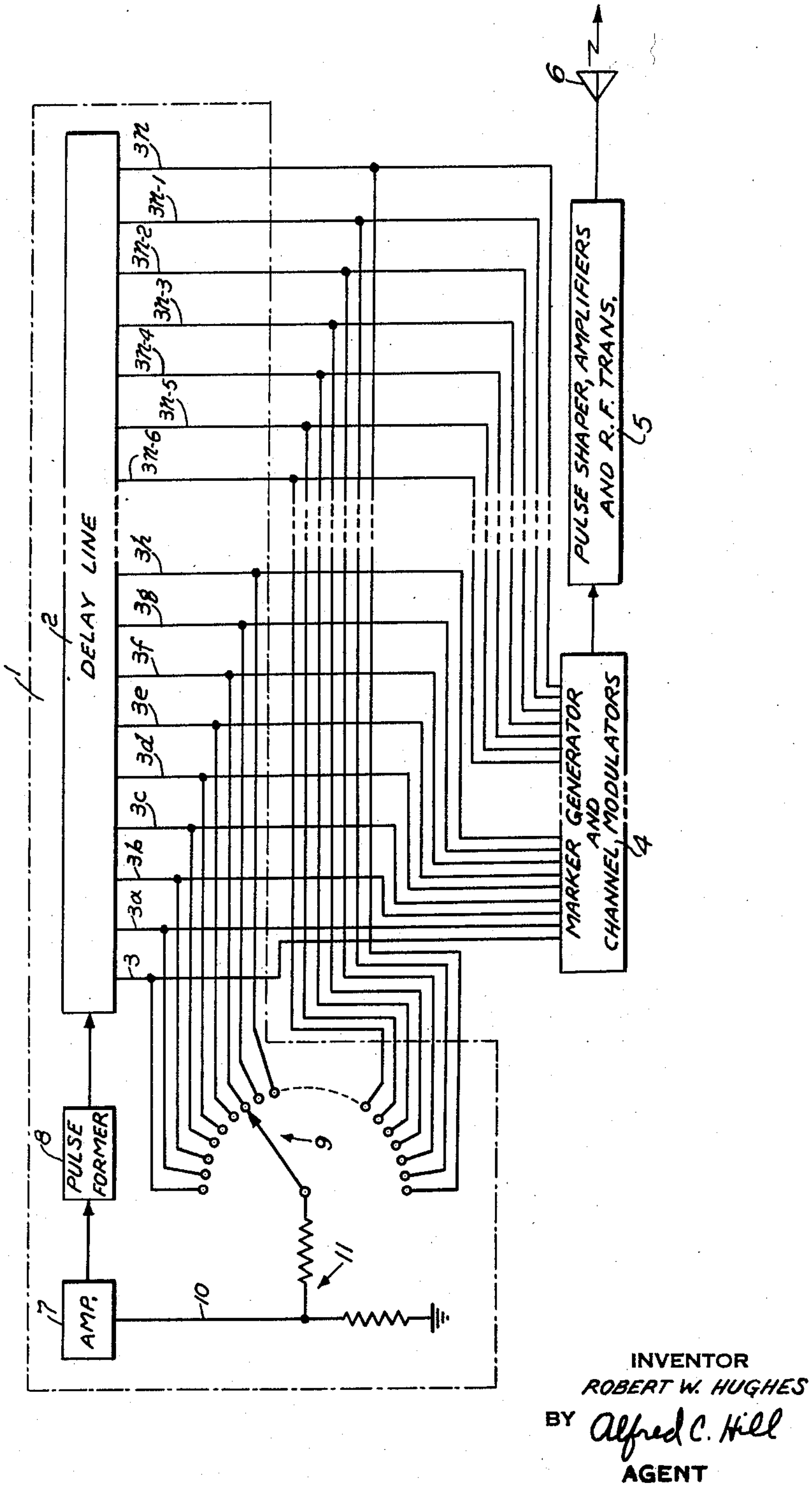
Figure 2:
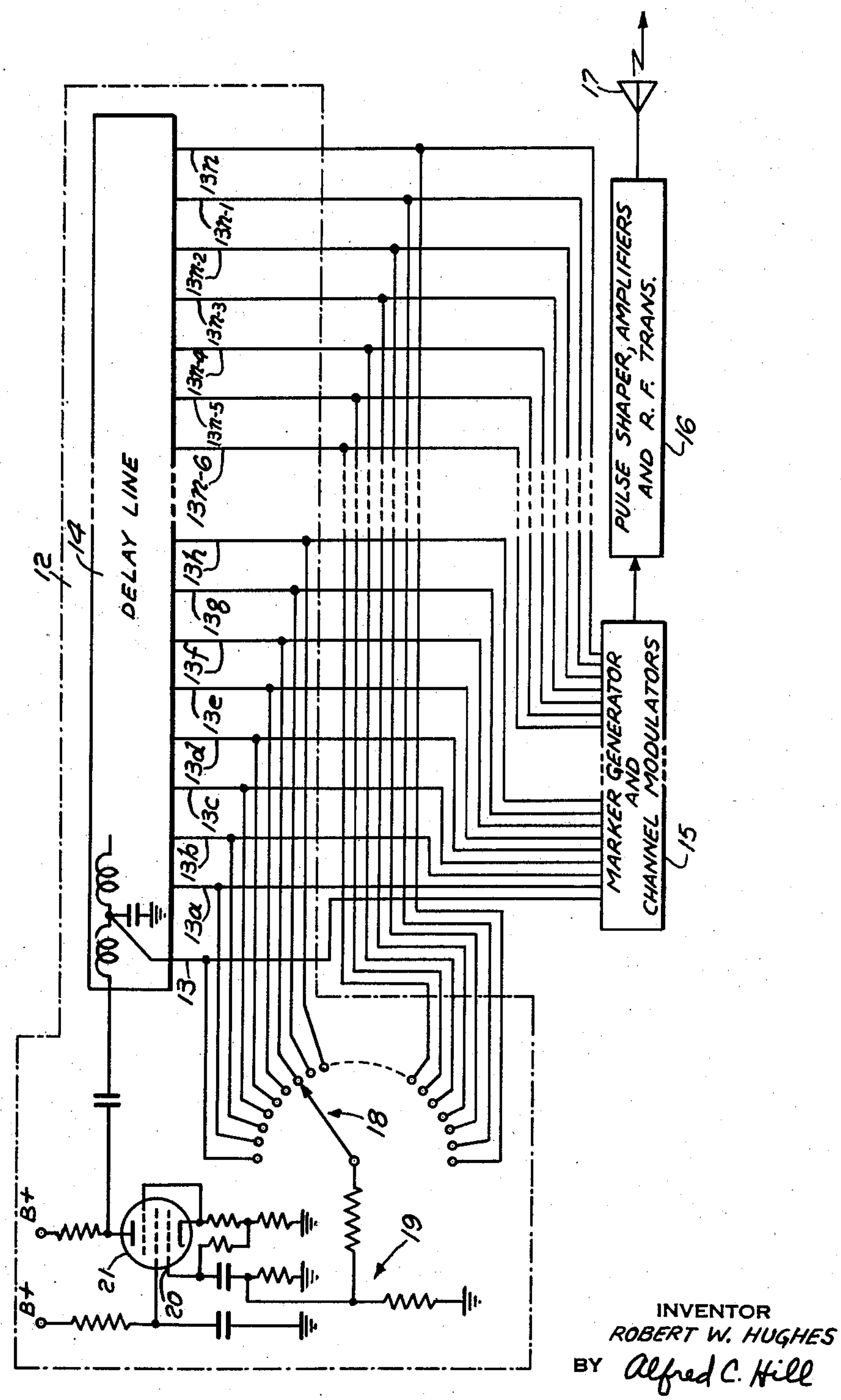

The above-mentioned and other features and objects of this invention will become more apparent by reference to the following description taken in conjunction with the accompanying drawings, in which:

Figs. 1 and 2 are schematic diagrams, partially in block form, of two types of multiplex pulse communication system transmitters employing the timing signal source of this invention.

Referring to Fig. 1 of the drawing, there is illustrated therein the modulation and radio equipment of a multiplex communication system transmitter wherein the timing signals applied to the marker generator and channel modulators are pulse type signals and incorporate a timing signal source 1 following the principles of this invention.

Timing signal source 1 includes a delay line 2 having a plurality of output taps 3 disposed therealong, each of said taps being connected to the output of a delay section, each of said delay sections providing an equal amount of time delay. The pulse signals appearing at each of the output taps 3 are coupled to a unit 4 which includes therein a marker generator responsive to the output of delay line tap 3 and a plurality of channel modulators coupled to output taps 3a–3a sequentially for production of a synchronizing signal and channel intelligence signals, respectively. The synchronizing signal and channel intelligence signals are interleaved in time to form a pulse train signal, the time spacing between the interleaved pulses being dependent upon the timing of the pulses present on the corresponding delay taps 3. The pulse train produced in unit 4 is coupled to a unit 5 for reshaping and amplification thereof prior to modulating a radio frequency carrier. The modulated radio frequency carrier is radiated to a distant demodulation terminal by means of antenna 6. To assure the production of equally spaced timing signals at taps 3, there is included in conjunction with delay line 2 an amplifier 7 and a pulse forming circuit 8. The necessary repetition frequency for the production of the timing signals is provided by the oscillatory loop including amplifier 7, pulse former 8, a given portion of delay line 2 and a feedback path including switch 9 and conductor 10. The given portion of delay line 2 is included in the feedback loop of the repetition frequency oscillator as the primary phase shifting element or frequency determining element of a phase shift oscillator. Therefore, if the effective electrical length of delay line 2 changes, the repetition frequency will change correspondingly such that the time interval between adjacent ones of the delay line taps will be maintained at a substantially constant fraction of the period of the repetition frequency of the oscillator.

The length of delay line 2 which is included in the feedback loop may be controlled by the operation of switch 9 which selects the output from a selected one of delay line taps 3 for coupling to the input, the control grid, of an amplifier tube included in amplifier 7. The amplitude of this feedback signal is adjusted by appropriately selecting given values for the resistors of voltage divider 11. The length of the delay line 2, the phase shift contributed by the delay line 2, is determined by the amount of phase shift experienced by the signal as it passes through amplifier 7 and pulse former 8. If the pulse former 8 and amplifier 7 includes electron discharge devices therein of odd number, the signal passing therethrough will experience an overall phase shift of 180°, thus, the delay line 2 must contribute 180° phase shift to assure the necessary 360° phase shift to sustain oscillation at the repetition frequency within timing source 1. If the amplifier 7 and pulse former 8 include therein an even number of electron discharge devices contributing 180° phase shift each, the total phase shift experienced by the signal in these two portions will be zero since the phase shift in the tubes will cancel each other. Thus, delay line 2 must supply a total of 360° phase shift. To meet these varying conditions of required phase shift from delay line 2, switch 9 is provided to couple the feedback energy from a selected one of delay line taps 3.

As in most oscillation circuits the signal output of amplifier 7 is a sine wave. However, to provide a pulse timing signal, pulse former 8 acts upon the sine wave output of amplifier 7 to translate the sine wave signal into a pulse signal occurring at the frequency of oscillation present in the source 1, in this instance the repetition frequency of the multichannel multiplex communication system.

By utilizing a selected portion of delay line 2 for the frequency determining element of the oscillations present in source 1, any changes in the length of delay line 2 will effect the frequency of source 1 but will maintain the time interval between adjacent ones of taps 3 at a constant fraction of the period of the repetition frequency provided the delay line components are equally effected, as in the case of a temperature change. This maintenance of a constant fraction of the repetition frequency period between adjacent taps of delay line 2 substantially eliminates the possibility of cross-talk between channels due to non-uniform variations in the delay line 2.

Referring now to Fig. 2 of the drawing, there is disclosed therein a multiplex communication system including a timing signal source 12 employing sine wave timing signals at the outputs of the delay line taps 13 of delay line 14. As discussed in connection with Fig. 1 the plurality of timing signals are connected to a marker generator and channel modulator unit 15. The marker generator and channel modulators included therein to convert the sine wave timing signal to synchronizing and channel pulses may take the form disclosed in the copending application of R. L. Plouffe, Jr., Serial No. 513,468, filed June 6, 1955, entitled "Pulse Communication System." As disclosed therein the sine wave timing signal is rectified to produce a sharp transition at the trailing edge of the half wave rectified signal. This trailing edge is modulated in accordance with the modulating signal and then differentiated to produce a time modulated channel pulse. The marker generator includes a parallel arrangement of the components of a channel modulator minus the modulation feature and a phase shift means is provided between the outputs of the branches of the parallel unit. Thus, the generated rectified wave having sharp trailing edge transitions are displaced one from the other which when differentiated will provide a double pulse type synchronizing signal. The pulse train output of unit 15 is coupled to the RF equipment 16 for radiation from antenna 17.

As in the case of Fig. 1, the desired repetition frequency is provided by the signal of selecting one of the output taps 13 by means of switch 18 and voltage divider 19 for coupling to the control grid 20 of the amplifier tube 21. The amplifier tube 21, the selected portion of delay line 14 and the feedback path including switch 18 and voltage divider 19 comprise the oscillatory loop for generating the repetition frequency. The delay line 14 further provides the plurality of sine wave timing outputs for achievement of the desired time division multiplexed pulse train signal. Since only electron discharge tube 21 is employed in source 12, the delay line 14 must contribute 180° of phase shift to the feedback signal since tube 21 contributes 180° of phase shift in its normal operation. The combination of these two phase shifts provide the necessary 360° of phase shift for developing the oscillation frequency necessary in the generation of the time multiplexed signal.

Having discussed two of the embodiments of the timing signal source of this invention, it will be obvious that for operation of the complete system there must be cooperation between the transmitting and receiving portions thereof, to synchronize the two portions and at the same time provide a phase coincidence between the outputs of the transmitting and receiving portion delay lines. This is true since the receiving portion delay line will not necessarily experience the same change in delay line components as was experienced by the transmitting portion delay line components. The attainment of such a proportional system, that is, the system channel spacings being a constant fraction of the repetition frequency period regardless of variations of electrical length thereof is described in the copending application of R. L. Plouffe, Jr., Serial No. 520,860, filed July 8, 1955, entitled "Pulse Communication System." There is described in detail a means to adjust the length of the receiving portion delay line for coincidence with the transmitting portion delay line which provides phase coincidence between the outputs of the two delay lines.

While I have described above the principles of my invention in conjunction with specific apparatus, it is to be clearly understood that this description is made only by way of example and not as a limitation to the scope of my invention as set forth in the objects thereof and in the accompanying claims.

I claim:

1. A combined oscillator and timing pulse distributor unit comprising an amplifier, a delay line, said delay line including a plurality of delay sections connected in series and a plurality of output taps disposed along said delay sections to have a given time interval therebetween to provide time spaced pulses for utilization, means coupling the pulses of a selected one of said output taps to the input of said amplifier to establish therein a sine wave oscillation at a predetermined frequency, a pulse former coupled to the output of said amplifier to convert said oscillations into pulses recurrent at said predetermined frequency and means coupling the pulse output of said pulse former to the input of said delay line.

2. In multiplex communication systems, a synchronizing signal generator, a plurality of channel signal modulators and a combined repetition frequency oscillator and timing pulse distributor unit, said combined unit comprising an amplifier, a delay line having a plurality of delay sections connected in series and a plurality of output taps disposed along said delay sections to provide a given time interval between their pulse outputs, means coupling the time pulses at said output taps to respective ones of said synchronizing signal generator and said channel modulators to cooperate in the formation at the output of said synchronizing signal generator and said channel modulators a time divided pulse train including a synchronizing pulse and a plurality of channel pulses, means coupling the pulses at a selected one of said output taps to the input of said amplifier to establish oscillations in said unit at a given repetition frequency, a pulse former coupled to the output of said amplifier to convert said oscillations into pulses recurrent at said predetermined frequency and means coupling the pulse output of said pulse former to the input of the delay line.

References Cited in the file of this patent

UNITED STATES PATENTS

| | | |
|---|---|---|
| 2,508,620 | Peterson | May 23, 1950 |
| 2,750,566 | Westcott | June 12, 1956 |

FOREIGN PATENTS

| | | |
|---|---|---|
| 905,657 | France | Apr. 3, 1945 |